United States Patent
Kalker et al.

(10) Patent No.: US 7,412,151 B1
(45) Date of Patent: Aug. 12, 2008

(54) DETECTION OF A WATERMARK IN A COMPRESSED VIDEO SIGNAL

(75) Inventors: Antonius A. C. M. Kalker, Eindhoven (NL); Jaap A. Haitsma, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/348,891

(22) Filed: Jul. 6, 1999

(30) Foreign Application Priority Data

Jul. 15, 1998 (EP) ................... 98202373

(51) Int. Cl.
*H04N 5/91* (2006.01)

(52) U.S. Cl. ................. 386/94; 375/240.25; 348/395.1; 380/202; 705/58

(58) Field of Classification Search ........... 386/1, 386/94, 33, 111, 112; 360/60; 382/100, 382/232, 250, 253; 380/200, 201, 203, 232; 705/56, 57, 58; 713/176; *H04N 5/76, 5/92, H04N 9/79*
See application file for complete search history.

(56) References Cited

U.S. PATENT DOCUMENTS

| | | | |
|---|---|---|---|
| 5,933,798 A | 8/1999 | Linnartz | 702/191 |
| 6,208,735 B1 * | 3/2001 | Cox et al. | 380/202 |
| 6,246,775 B1 * | 6/2001 | Nakamura et al. | 382/100 |
| 6,246,802 B1 * | 6/2001 | Fujihara et al. | 382/276 |
| 6,278,792 B1 * | 8/2001 | Cox et al. | 382/100 |
| 6,421,450 B2 * | 7/2002 | Nakano | 382/100 |
| 6,424,726 B2 * | 7/2002 | Nakano et al. | 382/100 |
| 6,700,989 B1 * | 3/2004 | Itoh et al. | 386/94 |

FOREIGN PATENT DOCUMENTS

| | | |
|---|---|---|
| EP | 0902591 A2 | 3/1999 |
| WO | WO 9803014 | 1/1998 |

* cited by examiner

*Primary Examiner*—John W. Miller
*Assistant Examiner*—James A. Fletcher
(74) *Attorney, Agent, or Firm*—Larry Liberchuk

(57) ABSTRACT

A method and arrangement for detecting a watermark embedded in an MPEG compressed signal includes a conventional MPEG decoder stripped to such an extent that a modified baseband video signal suitable for watermark detection is obtained. A plurality of pictures with the embedded watermark is accumulated (2,3,4) in the transform domain, and the inverse DCT (5) is applied to the accumulated result. Conventional watermark detection (6) is then applied to the accumulated plurality of pictures in the spatial domain.

6 Claims, 1 Drawing Sheet

DETECTION OF A WATERMARK IN A COMPRESSED VIDEO SIGNAL

BACKGROUND OF THE INVENTION

1. Field of the Invention

The invention relates to a method and arrangement for detecting a watermark in a compressed video signal. The invention also relates to an arrangement for decoding a compressed video signal so as to obtain a signal suitable for watermark detection.

2. Description of the Related Art

Watermarking is a technique of embedding imperceptible information in multimedia contents, such as, audio, still images or moving video. Watermarks are used for applications, such as, ownership verification, copyright protection and copy and playback control.

A watermark is often embedded in a video signal by slightly modifying the luminance pixels of the video signal in accordance with a watermark pattern. For the purpose of understanding this invention, it suffices to imagine the watermark pattern as an array of +1 and −1 values added to an equally sized array of pixels. The array of pixels having the same size as the watermark pattern is hereinafter referred to as a "picture". A picture may be a full-size video image (480*720 pixels for NTSC or 576*720 pixels for PAL) or a part thereof, for example, a sub-image of 128*128 pixels. If the watermark pattern is smaller than the image, it is known as a "tile". The pattern is then repeatedly used to obtain a "tiled" image. It is assumed that a plurality of pictures is watermarked with the same watermark pattern.

Detection of a watermark in a picture is, in essence, a thresholded correlation operation. A watermark detector decides whether or not a suspect picture is watermarked by computing the amount of correlation between the suspect picture and the watermark pattern to be detected, and comparing the result with a predetermined threshold. An example of such a watermark detector is disclosed in Applicant's International Patent Application WO-A-98/03014, corresponding to U.S. Pat. No. 5,933,798.

The subject invention addresses the problem of detecting a watermark in a compressed video signal. Video compression reduces the amount of data to be transmitted or recorded. A well-known example is MPEG compression. Briefly summarized, MPEG compression includes discrete cosine transform (DCT) of blocks of pixel values into blocks of coefficients. The coefficients are quantized causing many coefficients to assume the value zero. The quantized coefficients are variable-length encoded by assigning a Huffman codeword to each run of zero coefficients and a subsequent non-zero coefficient. The pictures can be encoded autonomously (I-pictures), or predictively (P- and B-pictures). In the latter case, residual pixel blocks (which are left after subtracting motion-compensated prediction blocks) are transformed rather than the pixel blocks themselves.

A straightforward method of detecting the watermark employs a cascade arrangement of a conventional MPEG decoder and a conventional watermark detector. However, it has a total complexity which is too large to serve as a viable solution for mere watermark detection, because MPEG decoding is a costly operation in terms of numbers of operations, complexity and amount of memory. This is particularly true for a DVD drive which is envisaged to include a watermark detector so as to determine whether a video program may or may not be copied, but does not itself include an MPEG decoder.

SUMMARY OF THE INVENTION

It is an object of the invention to provide a cost-effective method of detecting a watermark in a compressed video signal.

To this end, the method in accordance with the invention comprises the steps of accumulating spatially corresponding coefficients of a plurality of pictures, inverse transforming said accumulated coefficients into an accumulated plurality of pictures, and detecting the watermark in said accumulated plurality of pictures.

The invention is based on the recognition that a watermark embedded in a plurality of pictures is more reliably detected if the plurality of pictures is first accumulated and the watermark detection is then carried out on the result of the accumulation. The invention further exploits the insight that (inverse) transformation and accumulation are commutative operations which may be carried out in a reversed order.

The method has significant advantages over the straightforward method of first conventionally decoding the video signal and then detecting the watermark in the decoded signal. The number of inverse transform operations per unit of time is considerably reduced. Instead of inverse transforming each individual block of coefficients, the inverse transform is not carried out until a plurality of pictures has been accumulated, i.e., once per watermark detection period. Another advantage of the invention follows from the consideration that the coefficients of an MPEG-encoded video signal are variable-length encoded and that the number of bits per picture largely depends on whether the picture is an I-, P- or B-picture. In view thereof, a conventional MPEG decoder includes a large input buffer for converting the nearly constant bit-rate of the MPEG bitstream (for DVD, of the order of 10 Mbit/s) into a heavily varying bit-rate with maxima up to 40 Mbit/s, and the variable-length decoder must be capable of processing the highest instantaneous bit-rate. By interchanging the order of inverse transform and accumulation, the variable-length decoding can be carried out at the input bit-rate. The variable-length decoder is considerably simplified and the large input buffer is not needed. Further, the buffer for accumulating the coefficients has the size of the watermark pattern. For detecting a watermark in "tiled" images, such a buffer is considerably smaller than the full-size image buffer of a conventional MPEG decoder.

It has been found that the watermark is sufficiently present in residual pixel blocks. In view thereof, it is not necessary to reconstruct P- and B-pictures. The coefficients of these pictures may be accumulated directly. It has also been found, and experimentally verified, that motion compensation can be omitted for the purpose of watermark detection. The accumulation of coefficients may be carried out irrespective of motion vectors included in the signal. Circuitry for reconstructing P- and B-pictures, such as, a variable-length decoder for decoding motion vectors, a motion compensator, and two full-size frame memories, are therefore not needed.

DESCRIPTION OF THE PREFERRED EMBODIMENTS

Figure 1:
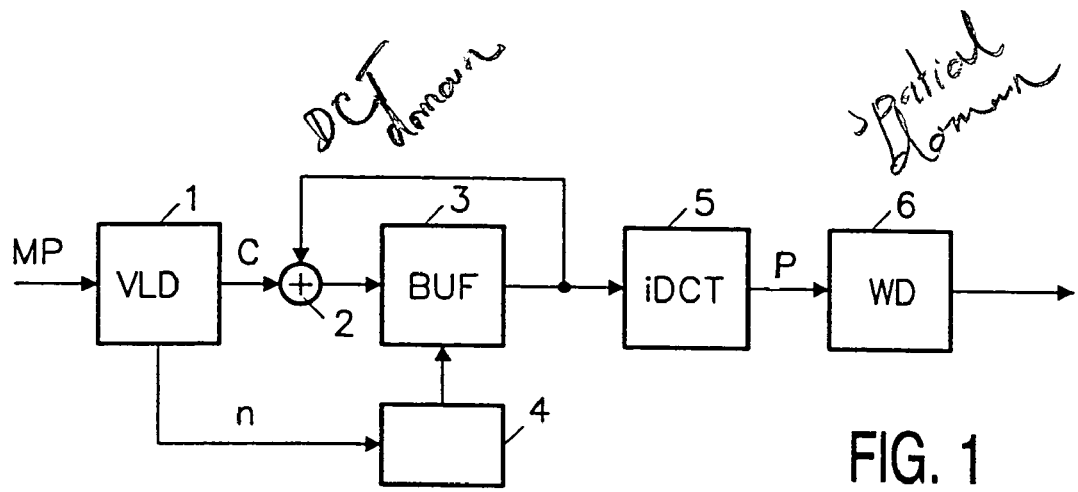
FIG. 1 shows, schematically, an arrangement for detecting a watermark in accordance with the invention.

FIG. 1 shows, schematically, an arrangement for detecting a watermark in accordance with the invention. The arrangement comprises a variable-length decoder 1, an accumulator 2, a buffer 3, an address generator 4, an inverse discrete cosine transformer 5 and a watermark detection circuit 6. The watermark detection circuit 6 is a conventional watermark detector as disclosed, for example, in International Patent Application WO-A-98/03014.

The arrangement receives a compressed video signal in the form of an MPEG bitstream MP. The majority of the payload of the MPEG bitstream includes variable-length encoded coefficients and motion vectors. In accordance with an aspect of the invention, the motion vectors are ignored. The codewords representing coefficients are decoded by the variable-length decoder 1. Many coefficients have the value zero. A single codeword represents a run of zero coefficients and a subsequent non-zero coefficient. A special codeword denotes the end of a block. For each coefficient, the variable-length decoder 1 generates the coefficient value C and its ordinal number n, i.e., its relative position in the block of 8*8 coefficients.

The spatially corresponding coefficients of a plurality of pictures are accumulated in an accumulation buffer 3. It is here assumed that the picture size (and thus the buffer size) is 128*128 pixels, i.e., an integral number of DCT blocks. The buffer 3 is addressed by an address generator 4 which keeps count of the position of the current DCT block within the picture and receives the ordinal coefficient number n from the variable-length decoder 1. The accumulator 2 adds the current coefficient value C to the result accumulated thus far. It is noted that, in accordance with one aspect of the invention, the coefficients are accumulated irrespective of whether they represent pixels or residual pixels, i.e., whether they originate from autonomously encoded I-pictures or predictively encoded P- or B-pictures.

Figure 2:
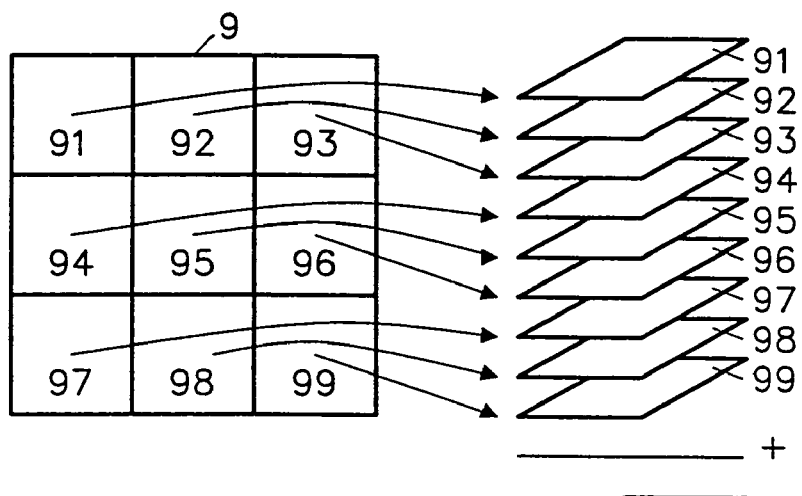
FIG. 2 shows a diagram to illustrate the operation of the arrangement which is shown in FIG. 1.

The above-described operational steps are illustrated in FIG. 2. In this Figure, reference numeral 9 represents a full-size tiled image in the transform domain. The image has been watermarked by repeatedly adding a watermark pattern to (sub)pictures 91-99 having a size of 128*128 pixels. As shown on the right-hand side of the Figure, the pictures 91-99 are folded and accumulated so that an accumulated picture 100 is obtained (still in the transform domain).

After accumulating the coefficients of a predetermined number of pictures (e.g., all pictures forming a full-size tiled image and/or a plurality of images), the accumulated result is applied to the DCT circuit 5 in which it is inverse transformed into the spatial domain. The accumulated spatial "picture" P is then applied to the conventional watermark detection circuit 6.

Figure 3:
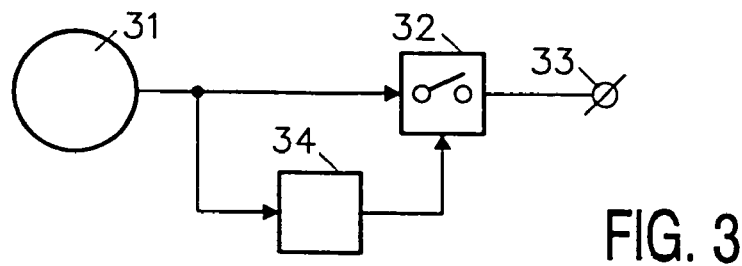
FIG. 3 shows a DVD drive including the arrangement shown in FIG. 1.

FIG. 3 shows a DVD drive for playing back an MPEG bitstream recorded on a disc 31. The recorded signal is applied to an output terminal 33 via a switch 32. The output terminal is connected to an external MPEG decoder and display device (not shown). It is assumed that the DVD drive may not play back video signals with a predetermined embedded watermark unless other conditions, which are not relevant to the invention, are fulfilled. For example, watermarked signals may only be played back if the disc 31 includes a given "wobble" key. In order to detect the watermark, the DVD drive comprises a watermark detector 34 as described above with reference to FIG. 1. The watermark detector 34 receives the recorded signal and controls the switch 32 in response to whether or not the watermark is detected.

In summary, a method and arrangement for detecting a watermark embedded in an MPEG compressed signal are disclosed. A conventional MPEG decoder is stripped to such an extent that a modified baseband video signal suitable for watermark detection is obtained In accordance with the invention, a plurality of pictures with the embedded watermark is accumulated in the transform domain, and the inverse DCT is applied to the accumulated result. Conventional watermark detection is then applied to the accumulated plurality of pictures in the spatial domain.

What is claimed is:

1. A method of detecting a watermark in a compressed video signal comprising spectral coefficients obtained by transforming at least one picture of said video signal, the method comprising:

accumulating, in a transform domain, spatially corresponding coefficients of a plurality of pictures of one frame of the video signal, wherein a picture is an array of pixels having the same size as the watermark;

inverse transforming said accumulated coefficients into an accumulated plurality of pictures in the spatial domain; and detecting the watermark in said accumulated plurality of pictures.

2. The method as claimed in claim 1, wherein said encoded video signal includes predictively encoded pictures each comprising coefficients representing a residual picture after subtracting a prediction picture, and wherein the step of accumulating coefficients is applied to the coefficients representing said residual pictures irrespective of coefficients representing the prediction picture.

3. The method as claimed in claim 2, wherein said predictively encoded pictures further include motion vectors, and wherein the step of accumulating coefficients is carried out irrespective of said motion vectors.

4. An arrangement for detecting a watermark in a compressed video signal comprising spectral coefficients obtained by transforming at least one picture of said video signal, the arrangement comprising:

means for accumulating, in a transform domain, spatially corresponding coefficients of a plurality of pictures of one frame of the video signal, wherein a picture is an array of pixels having the same size as the watermark;

means for inverse transforming said accumulated coefficients into an accumulated plurality of pictures in the spatial domain; and means for detecting the watermark in said accumulated plurality of pictures.

5. A device for recording and/or playing back a compressed video signal, said device comprising means for disabling recording and/or playback of the video signal in dependence upon the presence of a watermark in said video signal, characterized in that the device comprises an arrangement for detecting said watermark in the video signal, said arrangement comprising:

means for accumulating, in a transform domain, spatially corresponding coefficients of a plurality of pictures of one frame of the video signal, wherein a picture is an array of pixels having the sane size as the watermark;

means for inverse transforming said accumulated coefficients into an accumulated plurality of pictures in the spatial domain; and means for detecting the watermark in said accumulated plurality of pictures.

6. A method of detecting a watermark in a compressed video signal comprising spectral coefficients obtained by transforming at least one picture of said video signal, the method comprising:

accumulating, in a transform domain, spatially corresponding coefficients of at least one picture, wherein the accumulated coefficients comprise less data than one frame of the video signal;

inverse transforming said accumulated coefficients into an accumulated plurality of pictures in the spatial domain; and detecting the watermark in said accumulated plurality of pictures.

\* \* \* \* \*